(12) United States Patent
Fukuda

(10) Patent No.: US 8,482,944 B1
(45) Date of Patent: Jul. 9, 2013

(54) ELECTRONIC BALLAST WITH INRUSH PROTECTION CIRCUIT

(75) Inventor: Kenichi Fukuda, Burlington, MA (US)

(73) Assignee: Universal Lighting Technologies, Inc., Madison, AL (US)

( * ) Notice: Subject to any disclaimer, the term of this patent is extended or adjusted under 35 U.S.C. 154(b) by 285 days.

(21) Appl. No.: 12/975,191

(22) Filed: Dec. 21, 2010

Related U.S. Application Data

(60) Provisional application No. 61/408,379, filed on Oct. 29, 2010.

(51) Int. Cl.
*H02H 7/125* (2006.01)
(52) U.S. Cl.
USPC ............... 363/53; 363/89; 363/90; 363/97; 323/222
(58) Field of Classification Search
USPC ............... 363/49, 53, 56.03, 88, 89, 90, 96, 363/97; 323/222, 232
See application file for complete search history.

(56) References Cited

U.S. PATENT DOCUMENTS

| | | | | |
|---|---|---|---|---|
| 5,790,395 | A | * | 8/1998 | Hagen .......................... 363/89 |
| 6,737,845 | B2 | * | 5/2004 | Hwang ........................ 323/284 |
| 8,279,646 | B1 | * | 10/2012 | Hamstra ........................ 363/80 |

* cited by examiner

*Primary Examiner* — Nguyen Tran
(74) *Attorney, Agent, or Firm* — Waddey & Patterson, P.C.; Mark J. Patterson; Gary L. Montle

(57) ABSTRACT

An inrush protection circuit is provided for an electronic ballast for powering HID lamps. A first resistor is positioned along a low potential side of the circuit and a switching element coupled in parallel with the first resistor. Second and third resistors are coupled in series and effective to receive DC input power from a DC source, with a first node between the second and third resistors further coupled to the gate of the switching element. A capacitor is coupled in parallel with the third resistor to provide a smoothed DC voltage to the gate of the switching element. A discharging circuit includes a diode and a fourth resistor coupled in series between the first node and the high potential side of the circuit, and is arranged to conduct discharging current from the capacitor until the voltage across the capacitor discharges below a predetermined voltage after the DC input power is removed from the circuit.

11 Claims, 5 Drawing Sheets

ELECTRONIC BALLAST WITH INRUSH PROTECTION CIRCUIT

CROSS-REFERENCES TO RELATED APPLICATIONS

This application claims benefit of the following patent application(s) which is/are hereby incorporated by reference: U.S. Provisional Patent Application No. 61/408,379, filed Oct. 29, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to High Intensity Discharge (HID) lamps and electronic ballasts for powering such lamps. More particularly, the present invention relates to various embodiments of an inrush protection circuit for use in an electronic ballast for powering an HID lamp.

Generally stated, an HID electronic ballast includes a tank circuit which stores energy so that the ballast can continue to power the load (i.e., an HID lamp) for a certain period of time even if the input power source to the ballast is disconnected for some reason, such as a black out. This function is required because an HID lamp will not restart immediately after extinguishing until it is cooled down. To minimize operational inconvenience, the ballast should not extinguish the lamp during very short-term black outs, in the order of tens of milliseconds.

A second function of the tank circuit is to smooth out the AC input ripple so that an output power regulation circuit which connects to the tank circuit can regulate the output to the HID lamp without having any adverse effect from the input ripple. The higher the capacitance in the tank circuit, the lower the AC ripple that will appear on the rectified bus voltage, but the higher the spike current to charge the tank circuit capacitor.

In designs where a high spike current is presented to charge the tank circuit capacitor when the power is initially applied, the spike current needs to be controlled. This spike current is also known in the art as an inrush current. Generally, the inrush current needs to be less than a certain value to avoid problems such as, for example, the welding of switches or terminals which are incorporated within the ballast due to the high peak current, or to prevent the circuit breaker which is in series with the input power source and the lighting fixtures from becoming active.

A common method for preventing excessive inrush current is to add resistive impedance into the circuit of the ballast. The resistive impedance limits the peak of the inrush current at initial power up. At the same time, a switch is added in parallel with the resistive impedance. The switch will be turned on to short the resistive impedance when the tank circuit has been charged up enough not to have too high peak current even with the shorted resistive impedance. In this configuration, the inrush current flows through the resistive impedance, while in normal operation the input current flows through the switch. This circuit arrangement which limits the inrush current and bypasses the inrush current limiting element for normal operation is called an inrush protection circuit.

FIG. 1 shows a first example of an inrush protection circuit 11 in a ballast 1 as conventionally known in the art having a boost chopper as a PFC (Power Factor Correction) circuit. This inrush protection circuit 11 is relatively simple. The switching element Q1 is passively controlled. DB1 is the diode bridge and it rectifies the AC input power source. R1 is a resistor which is provided along the low potential side (i.e., ground, or alternatively stated the negative terminal of the circuit) of the rectified input voltage. Q1 is a MOSFET switch and is coupled in parallel with resistor R1.

R2 and R3 are resistors which divide the rectified input voltage and provide the voltage at the gate of switch Q1. C2 is a capacitor coupled across the gate of switch Q1. L1, D1, and Q2 are an inductor, diode and MOSFET, respectively, and they collectively form a boost chopper PFC circuit. C0 is a film capacitor which can carry the high frequency current for the PFC circuit. C1 is an electrolytic capacitor and it is further part of the tank circuit of the ballast. Capacitor C1 has enough capacitance to deliver power to the load, which includes the output power regulation circuit, for a certain period of time when the input power source is disconnected in normal operation. The capacitance is also large enough to filter out the AC ripple voltage after rectification.

When the input power source is connected to the ballast, the gate voltage of switch Q1 is gradually charged up by the rectified input voltage, depending on the divider ratio between resistors R2 and R3, and further depending on the time constant between resistor R2 and capacitor C2. When switch Q1 is off, the inrush current delivered from the input power source to charge up capacitor C1, the tank circuit, flows through a circuit loop consisting of diode-bridge DB1, inductor L1, diode D1, capacitor C1, and R1 as the resistive impedance. The peak of the inrush current is mainly controlled by resistor R1. At the same time, capacitor C1 is also being charged up by the boost chopper. When the gate voltage of the switch Q1 exceeds the threshold voltage of the switch Q1, switch Q1 turns on. After switch Q1 turns on, the input current flows through switch Q1 instead of resistor R1. If capacitor C1 is charged up more than the peak of the input voltage when switch Q1 turns on, no high peak charging current flows through C1 and switch Q1.

There are three design parameters for this inrush protection circuit which may be given primary consideration. The first is that the time constant of resistor R2 and capacitor C2 should be large enough not to turn on switch Q1 right away after the input power source is connected. The second one is that the gate voltage of switch Q1 should be higher than the turn-on threshold voltage of switch Q1 during normal operation so that switch Q1 does not carry any unintended loss. The third one is the time constant of resistor R3 and capacitor C2 should be as short as possible, so that switch Q1 can turn off when the input power is removed.

However, because switch Q1 is controlled passively, the discharging time of the gate voltage of switch Q1 when the input power source is disconnected depends primarily on the time constant of resistor R3 and capacitor C2, which cannot be very small due to the second of the design constraints mentioned above. That is, switch Q1 will stay on for a relatively long time after the input power source is disconnected. If the input power source is momentarily disconnected during normal operation due to for example blackout, etc., the ballast will continue to deliver energy to the HID lamp from capacitor C1. The voltage on capacitor C1 will reduce sharply. In this situation, because of the switch Q1 being on, there is no resistive impedance in series in the input circuit, and the inrush current may be very high when the input power source is reconnected. This high inrush current flows through the switching element Q1 to charge the tank circuit C1, which is a major concern not only for the inrush current itself, but also for the operational reliability of switch Q1.

FIG. 2 shows another example of an inrush protection circuit 21 configuration alongside a boost chopper as the PFC circuit in an electronic ballast 2. This inrush protection circuit 21 is more intelligent compared with the example 11 shown in FIG. 1, but also more expensive. The turn-on of switch Q1 is passively controlled by the input voltage, while the turn-off of switch Q1 is actively controlled by signal IC2-1(-2). In addition to the circuit arrangement of the previous example, the controller IC1 is needed to sense the voltage across C1 and forces switch Q1 to turn off when the voltage on capacitor C1 becomes low by shorting capacitor C2 with signal IC2-2. R4 is a resistor provided to regulate the current of IC2-1.

When the input power source is connected to the ballast 2, the gate voltage of switch Q1 is gradually charged up in substantially the same way as in the example of FIG. 1. When the input power source is disconnected, switch Q1 can be turned off immediately and no high peak inrush will occur whenever the input power source is re-connected.

However, as previously stated this circuit 21 is more expensive because of the added components controllers IC1 and IC2. The circuit arrangement is also more complex. Controller IC1 may be utilized for other functions of the ballast, such as the output power regulating controller, but the design layout may be difficult since controller IC1 now needs to be dedicated not only to the output side of the ballast but also to the input side. Controller IC1 is also required to have one extra pin to control controller IC2. An isolated device, controller IC2, such as an opto-coupler is needed because the circuit GND which connects to controller IC1 is the drain of switch Q1, not the source.

The conventionally known examples 11 and 21 as described herein are therefore either lacking in certain desired functionality or prohibitively expensive and complex.

BRIEF SUMMARY OF THE INVENTION

In various embodiments of the present invention arrangements of an inrush protection circuit are provided which may be simple and inexpensive, yet satisfy the required functions which limit the inrush current during the entire operation of the ballast.

In an embodiment, an electronic ballast with an inrush protection circuit of the present invention includes a diode bridge to rectify an AC input voltage from an AC power source and a power factor correction circuit having a first capacitor coupled across high and low potential sides of the rectified AC input voltage. A tank circuit includes a second capacitor effective to store electricity provided from the power factor correction circuit and further coupled across a load. A first resistor is positioned along the low potential side of the rectified AC input voltage and between the diode bridge and the power factor correction circuit. A switching element is coupled in parallel with the first resistor. An input voltage dividing network is made up of second and third resistors. A first node between the second and third resistors is further coupled to the gate of the switching element. A third capacitor is coupled in parallel with the third resistor to provide a smoothed DC voltage to the gate of the switching element. A discharging circuit is coupled in series between the third capacitor and the high potential side of the rectified AC input voltage, and arranged to conduct discharging current from the third capacitor to the first capacitor when the voltage across the first capacitor is less than the voltage across the third capacitor. The power factor correction circuit is effective to deliver current from the first capacitor to the second capacitor until the voltage across the third capacitor discharges below a first predetermined voltage when the AC input voltage is removed from the circuit.

In another embodiment, an inrush protection circuit is provided for an electronic ballast for powering HID lamps. A first resistor is positioned along a low potential side of the circuit and a switching element coupled in parallel with the first resistor. Second and third resistors are coupled in series and are effective to receive DC input power from a DC source, with a first node between the second and third resistors further coupled to the gate of the switching element. A capacitor is coupled in parallel with the third resistor to provide a smoothed DC voltage to the gate of the switching element. A discharging circuit includes a diode and a fourth resistor coupled in series between the first node and the high potential side of the circuit, and is arranged to conduct discharging current from the capacitor until the voltage across the capacitor discharges below a predetermined voltage after the DC input power is removed from the circuit.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Figure 3:
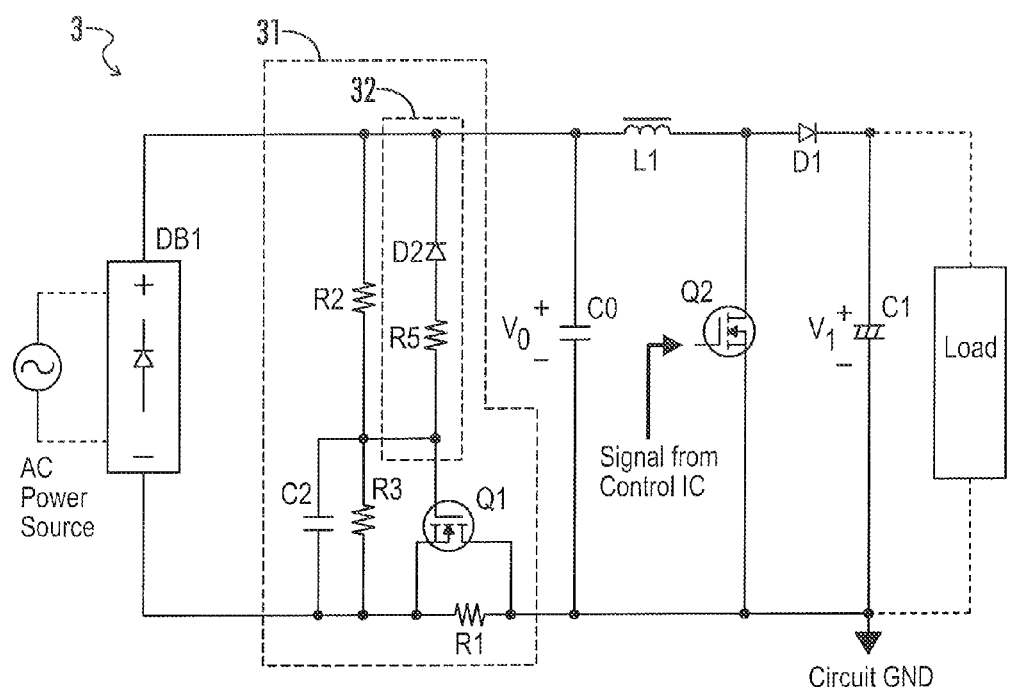
FIG. 3 is a simplified circuit diagram of an embodiment of the electronic ballast with an inrush protection circuit of the present invention.
Figure 5:
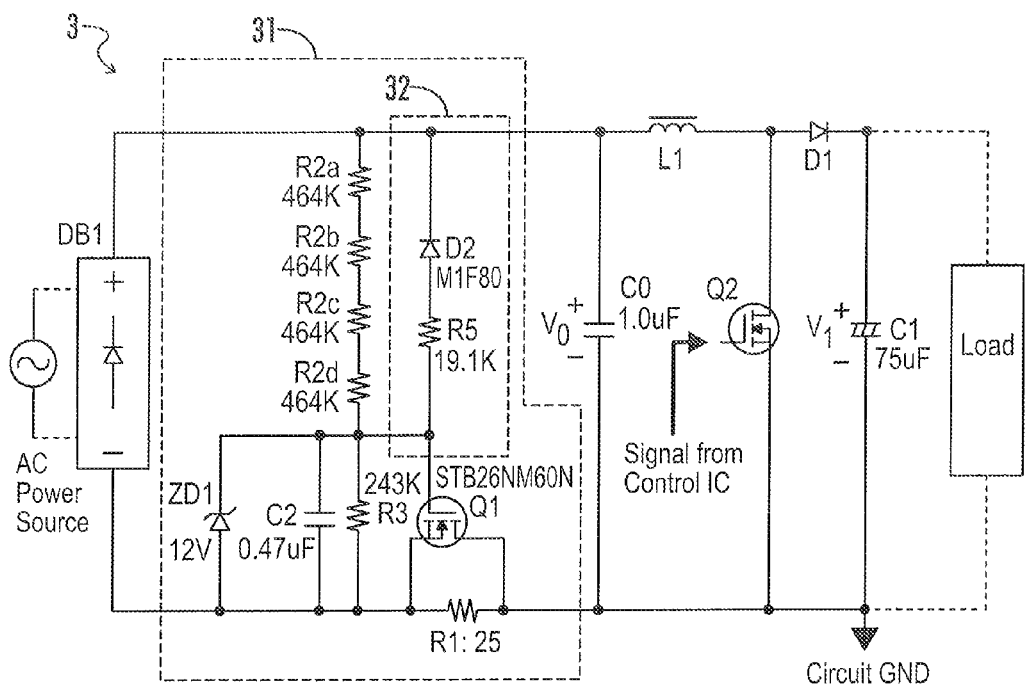
FIG. 5 is a more detailed circuit diagram of the ballast with the inrush protection circuit of FIG. 3.

Referring generally to FIGS. 3 and 5, embodiments of an inrush protection circuit in accordance with the present invention may be described herein. Where the various figures may describe embodiments sharing various common elements and features with other embodiments, similar elements and features are given the same reference numerals and redundant description thereof may be omitted below.

Referring first to FIG. 3, an embodiment of an inrush protection circuit 31 of the present invention includes a discharging circuit 32 having a resistor R5 and a diode D2 which are connected in series between the gate of switch Q1 and the high side of the rectified input voltage. Resistor R5 is selected to have a value much smaller than resistor R3 while diode D2 is selected to have the same voltage rating as DB1.

Figure 1:
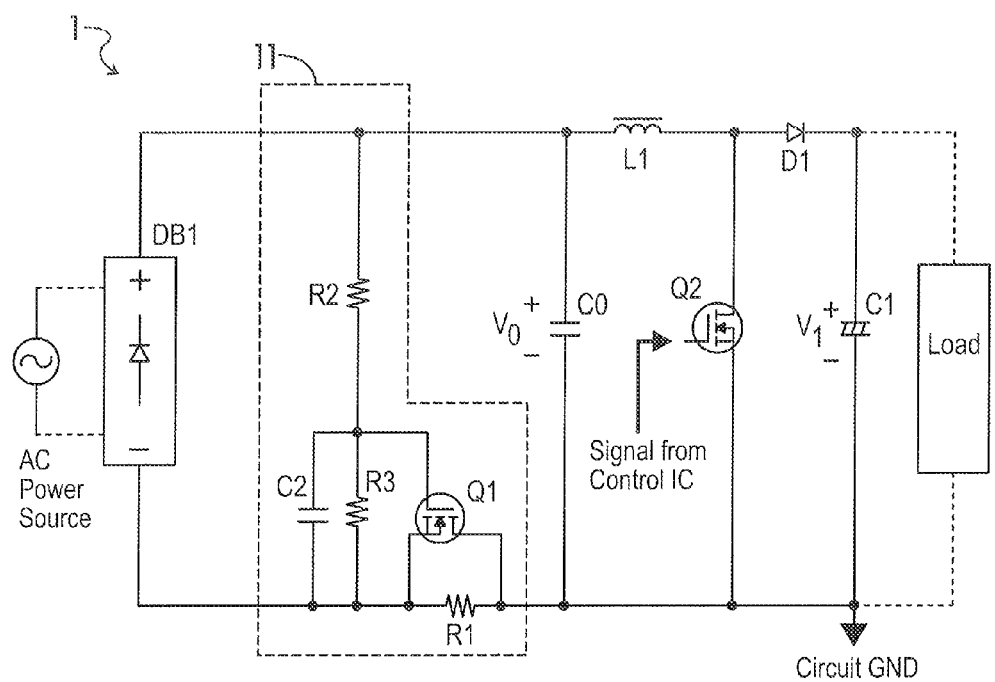
FIG. 1 is a simplified circuit diagram of an electronic ballast with an inrush protection circuit as previously known in the art.
Figure 2:
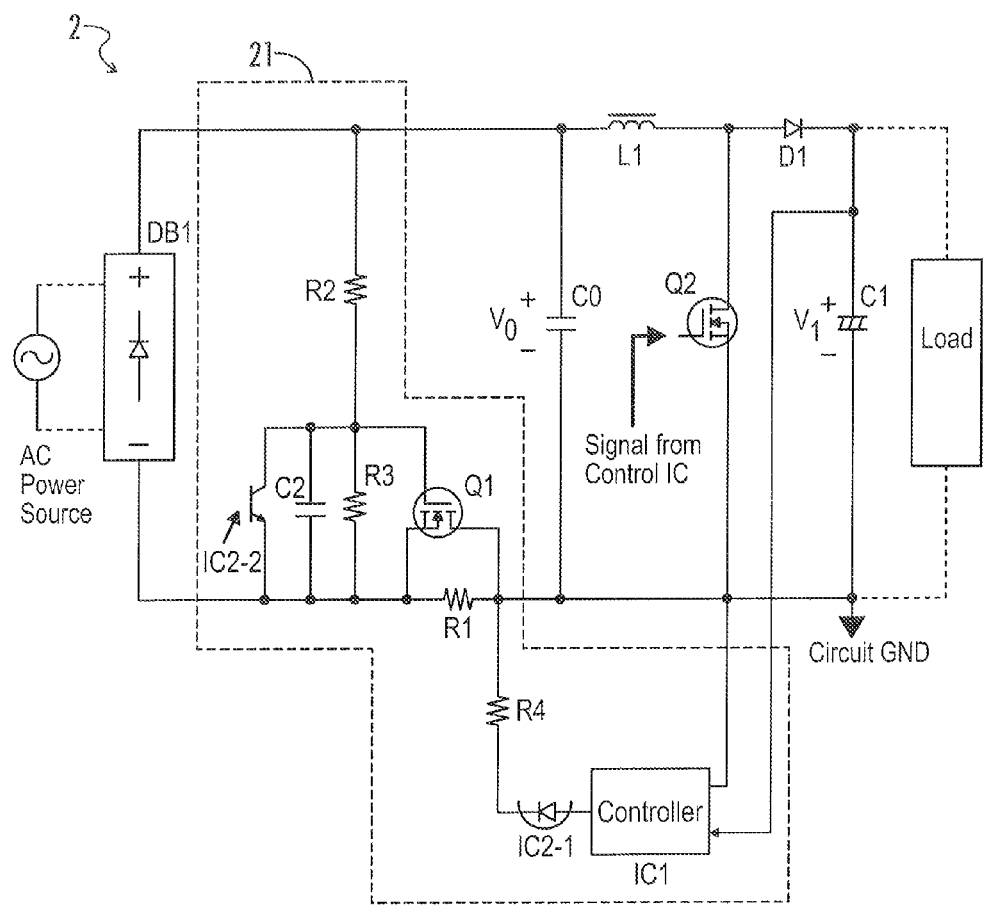
FIG. 2 is a simplified circuit diagram of another electronic ballast with an inrush protection circuit as previously known in the art.

When the input voltage source is disconnected, the voltage across capacitor C0 will go to zero almost immediately because the PFC circuit is still functioning and delivering power from capacitor C0 to capacitor C1. When the voltage across capacitor C0 becomes less than the gate voltage of switch Q1, which is the same as the voltage of capacitor C2, capacitor C2 starts to discharge through a discharge loop defined by resistor R5, diode D2, capacitor C0, and switch Q1. Because capacitor C0 continues to deliver power to PFC, capacitor C0 is not charged up by the discharging of capacitor C2. The discharging current from capacitor C2 continues flowing through capacitor C0 via resistor R5, diode D2 and switch Q1. The time constant of the loop may be much smaller than the time constant of capacitor C2 and resistor R3 so that switch Q1 can turn off much faster in comparison with the circuit as shown in FIG. 1. By doing so, switch Q1 can turn off before the voltage of capacitor C1 becomes low. The inrush current may be limited by resistor R1 when the input power comes back after a momentarily drop. Both diode D2 and resistor R5 do not require any high current rating since they only discharge the gate voltage of switch Q1, and are thereby relatively inexpensive.

In various embodiments of an inrush protection circuit as may be described in further detail herein, the allowed inrush current may be set to 15 A peak, for explanatory purposes only and not for the purpose of otherwise limiting the scope of the present invention.

Figure 4:
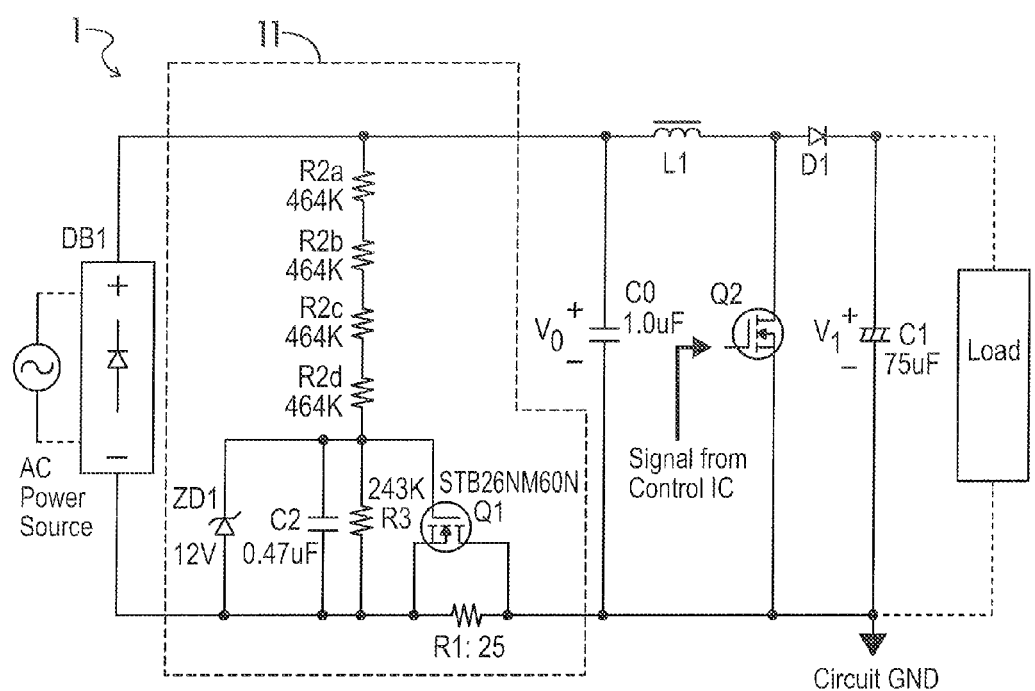
FIG. 4 is a more detailed circuit diagram of the ballast with the previously known inrush protection circuit of FIG. 1.

As the conventional example of the ballast and inrush protection circuit as shown in FIG. 4 and the example of the ballast and inrush protection circuit of the present invention as shown in FIG. 5 are substantially similar in various aspects but for some added circuit components in the example of FIG. 5, a detailed explanation with regards to the circuit of FIG. 4 may be undertaken first and may apply generally as well to the circuit of FIG. 5 except where otherwise stated.

FIG. 4 shows the conventional example of a 150 W electronic HID ballast design with an inrush protection circuit. The load, including the power regulation circuit which is the buck converter, is connected to capacitor C1. The output power to the load including the power regulation circuit is 158 W in normal operation. The power regulation circuit regulating the average current from capacitor C1 to the load is fixed in normal operation. The input voltage can vary from 120V~277V. Diode bridge DB1 is composed of four (4) diodes, such as type S3K from Fairchild. Resistor R1 is selected to be 25 ohms and is connected in parallel with switch Q1, which may be a type STB26NM60N from ST Microelectronics. Resistor R2 is divided into four (4) resistors of 464 k ohm each. The 12V zener diode ZD1 is connected in parallel with resistor R3 to clamp the voltage across resistor R3 to 12V across the entire range of the input voltage. Resistor R3 is selected to be 243 kohm and capacitor C2 is selected to be 0.47 µF so that capacitor C2 can be charged up to 12V across the entire range of the input voltage, which is enough to operate switch Q1 without having any unintended loss in normal operation. Inductor L1, switch Q2, and diode D1 collectively form the boost chopper PFC circuit. The output voltage to capacitor C1 is boosted up to 465V so that the PFC circuit can be functional across the entire range of the input voltage during normal operation. Capacitor C0 is the input capacitor of the PFC circuit and the capacitance is set to 1.0 µF. Capacitor C1 is the tank circuit of the ballast and the capacitance is set to 75 µF.

According to the given specifications for the switch Q1, switch Q1 can carry 15 A when the gate voltage is more than 5V. When the input power source is connected, capacitor C2 is gradually charged up by the rectified input voltage through resistors R2a~R2d. It takes about 20 ms to be charged up to 5V if the input voltage is 277V. The charging time, tc, is calculated by the following equation:

$$tc = -0.47 \text{ uF} * 464 \text{ Kohm} * 4 * \text{Ln}\left(1 - \dfrac{5 \text{ V}}{\dfrac{\left(277 \text{ V} * 2 * \dfrac{\sqrt{2}}{pi}\right) * 464 \text{ Kohm} * 4}{(464 \text{ Kohm} * 4 + 243 \text{ Kohm})}}\right)$$

On the other hand, capacitor C1 is almost fully charged through resistor R1 up to the rectified input voltage (or even more due to the boost chopper) after 20 ms. Therefore, no high peak inrush current will occur after 20 ms even if switch Q1 is turned on. With 120V input voltage, it takes about 47 ms to charge capacitor C2 up to 5V. The charging time tc is calculated by the following equation:

$$tc = -0.47 \text{ uF} * 464 \text{ Kohm} * 4 * \text{Ln}\left(1 - \dfrac{5 \text{ V}}{\dfrac{\left(120 \text{ V} * 2 * \dfrac{\sqrt{2}}{pi}\right) * 464 \text{ Kohm} * 4}{(464 \text{ Kohm} * 4 + 243 \text{ Kohm})}}\right)$$

Capacitor C1 is therefore charged up to the rectified input voltage (or even more due to the boost chopper) at this time, and thus the inrush protection circuit even with the circuit arrangement of FIG. 4 is functional when the input power source is initially connected.

However, when the input voltage is disconnected, it takes about 100 ms to discharge capacitor C2 from 12V to 5V through resistor R3. This discharging time, td, may be calculated using the following equation:

$$td = -0.47 \text{ uF} * 243 \text{ Kohm} * \text{Ln}\left(\dfrac{5 \text{ V}}{12 \text{ V}}\right)$$

On the other hand, the voltage across capacitor C1 is dropping lower and lower because capacitor C1 keeps delivering the required current to the power regulation circuit, which is a fixed average current in normal operation as mentioned above, even without input power source. Therefore, the voltage across capacitor C1 can be below the peak input voltage, which is 391V (=277*√2), in about 16.3 ms. The time t_C1 @391 Vdc may be calculated using the following equation:

$$t\_C1@391Vdc = \frac{(465 \text{ V} - 391 \text{ V}) * 75 \text{ uF} * 465 \text{ V}}{158 \text{ W}}$$

If the input power source comes back between 16.3 ms (when the capacitor C1 voltage is below the peak of the input voltage) and 100 ms (when switch Q1 is still on), the inrush current with very high peak will flow through switch Q1 and C1 without having any resistive impedance.

An embodiment of an inrush protection circuit 31 of the present invention as shown in FIG. 5 includes a discharging circuit 32 with only two components in addition to the above mentioned example of an inrush protection circuit arrangement. One is a 19.1 kohm resistor R5 and the other is a diode D2: M1F80 from Shindengen, which are connected in series between C2 and the high side of the rectified input voltage. They are actually in parallel with resistors, R2a~R2d, so difficulties in the design layout may be substantially reduced.

When the input voltage is disconnected during normal operation, the voltage across capacitor C0 may approach zero immediately because the boost chopper is still functional. Then, the voltage across capacitor C2 can start discharging not only flowing through resistor R3 but also largely flowing through a discharge loop defined by resistor R5, diode D2, and capacitor C0 because the time constant of resistor R5 and capacitor C2 is much smaller than the time constant of resistor R3 and capacitor C2. As mentioned above, because the boost chopper circuit is functional, capacitor C0 is never charged up so that the discharging current from capacitor C2 can keep flowing through capacitor C0. With the above circuit arrangement, the discharging time of capacitor C2 is less than 8 ms from 12V to 5V. The discharging time, t_C2_discharge, may be calculated using the following equation:

t_C2_discharge=−0.47 uF*19.1 Kohm*Ln(5V/12V)

Switch Q1 will turn off or otherwise cannot deliver more than 15 A in 8 ms after the input power source is disconnected. In other words, the inrush protection circuit is already functional before the voltage across capacitor C1 drops below the peak of the input voltage, 391V, due to a lack of input power. No peak inrush current higher than 15 A will occur even if the input is reconnected. Actually, in accordance with design parameters for the electronic ballast, the boost chopper circuit may be required to remain functional at least for 8 ms after the input power source is disconnected.

The foregoing embodiment is merely exemplary and is not to be construed as limiting the present invention. The description of the present invention is intended to be illustrative, and not to limit the scope of the claims. Many alternatives, modifications, and variations will be apparent to those skilled in the art.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term 'invention' merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Modification of the above embodiment, and other embodiments not specifically described herein, will be apparent to those of skill in the art upon reviewing the description.

The previous detailed description has been provided for the purposes of illustration and description. Thus, although there have been described particular embodiments of the present invention of a new and useful "Electronic Ballast with Inrush Protection Circuit," it is not intended that such references be construed as limitations upon the scope of this invention except as set forth in the following claims.

What is claimed is:

1. An electronic ballast comprising:
a diode bridge functional to rectify an AC input voltage from an AC power source;
a power factor correction circuit comprising a first capacitor coupled across high and low potential sides of the rectified AC input voltage;
a second capacitor effective to store electricity provided from the power factor correction circuit and further coupled across a load,
a first resistor coupled along the low potential side of the rectified AC input voltage and between the diode bridge and the power factor correction circuit,
a switching element coupled in parallel with the first resistor;
an input voltage dividing network comprising second and third resistors, a first node between the second and third resistors further coupled to the gate of the switching element;
a third capacitor coupled in parallel with the third resistor to provide a smoothed DC voltage to the gate of the switching element; and
a discharging circuit comprising a diode and a fourth resistor coupled in series between the first node and the high potential side of the rectified AC input voltage, the fourth resistor having a resistance value substantially less than a resistance value of the third resistor, wherein a time constant associated with the fourth resistor and the third capacitor is substantially less than a time constant associated with the third resistor and the third capacitor,
the discharging circuit arranged to conduct discharging current from the third capacitor to the first capacitor when the voltage across the first capacitor is less than the voltage across the third capacitor,
wherein the power factor correction circuit is effective to deliver current from the first capacitor to the second capacitor until the voltage across the third capacitor discharges below a first predetermined voltage when the AC input voltage is removed from the circuit,
wherein the discharging circuit is effective to turn off the switching element before the voltage across the second capacitor drops below a second predetermined voltage equal to the peak voltage of the rectified AC input voltage.

2. The electronic ballast of claim 1, the discharging current from the third capacitor effective to passively turn on and off the switching element.

3. The electronic ballast of claim 2, the diode having a voltage rating equivalent to a voltage rating for the diode bridge.

4. The electronic ballast of claim 1, wherein the power factor correction circuit is effective to deliver current from the first capacitor to the second capacitor for a predetermined period of time after the AC input voltage is reconnected to the circuit.

5. An inrush protection circuit for an HID ballast, the protection circuit comprising:
 a first resistor positioned along a low potential side of the circuit;
 a switching element coupled in parallel with the first resistor;
 a voltage dividing network comprising second and third resistors coupled in series and effective to receive DC input power from a DC source, a first node between the second and third resistors further coupled to the gate of the switching element;
 a capacitor coupled in parallel with the third resistor to provide a smoothed DC voltage to the gate of the switching element; and
 a diode and a fourth resistor coupled in series between the first node and the high potential side of the circuit and arranged to conduct discharging current from the capacitor until the voltage across the capacitor discharges below a predetermined voltage equal to the peak voltage of the DC input power after the DC input power is removed from the circuit,
 the fourth resistor having a resistance value substantially less than a resistance value of the third resistor, wherein a time constant associated with the fourth resistor and the capacitor is substantially less than a time constant associated with the third resistor and the capacitor.

6. The inrush protection circuit of claim 5, the discharging current from the capacitor effective to passively turn on and off the switching element.

7. The inrush protection circuit of claim 5, the series connection of the diode and the fourth resistor arranged to conduct discharging current from the capacitor for a predetermined period of time after the DC input power is reconnected to the circuit.

8. An electronic ballast comprising:
 a diode bridge functional to rectify an AC input voltage from an AC power source;
 a power factor correction circuit comprising a first capacitor coupled across high and low potential sides of the rectified AC input voltage;
 a second capacitor effective to store electricity provided from the power factor correction circuit and further coupled across a load;
 a first resistor positioned along the low potential side of the rectified AC input voltage and between the diode bridge and the power factor correction circuit,
 a switching element coupled in parallel with the first resistor;
 an input voltage dividing network comprising second and third resistors, a first node between the second and third resistors further coupled to the gate of the switching element;
 a third capacitor coupled in parallel with the third resistor to provide a smoothed DC voltage to the gate of the switching element; and
 a discharging circuit comprising a diode and a fourth resistor coupled in series between the first node and the high potential side of the rectified AC input voltage, the fourth resistor having a resistance value substantially less than a resistance value of the third resistor, wherein a time constant associated with the fourth resistor and the third capacitor is substantially less than a time constant associated with the third resistor and the third capacitor,
 wherein the discharging circuit is effective to turn off the switching element before the voltage across the second capacitor drops below a predetermined voltage equal to the peak voltage of the rectified AC input voltage.

9. The electronic ballast of claim 8, the discharging current from the third capacitor effective to passively turn on and off the switching element.

10. The electronic ballast of claim 9, the diode having a voltage rating equivalent to a voltage rating for the diode bridge.

11. The electronic ballast of claim 8, wherein the power factor correction circuit is effective to deliver current from the first capacitor to the second capacitor for a predetermined period of time after the AC input voltage is reconnected to the circuit.

* * * * *